Oct. 4, 1932.  R. M. CHAMBERS  1,880,236

GAUGE

Filed June 5, 1925

INVENTOR
REED M. CHAMBERS.
BY Stockbridge & Borst
ATTORNEYS.

Patented Oct. 4, 1932

1,880,236

UNITED STATES PATENT OFFICE

REED M. CHAMBERS, OF SAN FRANCISCO, CALIFORNIA, ASSIGNOR, BY MESNE ASSIGNMENTS, TO BENDIX STROMBERG CARBURETOR COMPANY, OF SOUTH BEND, INDIANA, A CORPORATION OF ILLINOIS

GAUGE

Application filed June 5, 1925. Serial No. 35,064.

This invention relates to devices for indicating the quantity or level of liquid in a container or tank, particularly at a distance from the container. For example, in automobiles the main fuel tank is commonly located at the rear end, or under a seat of the automobile, and it is desirable that the driver or operator of the automobile be able to ascertain the quantity of fuel in his main supply tank without leaving the driver's seat.

Various attempts have been made heretofore to indicate from a distance the varying levels of the liquid in a container, but such devices have been unsatisfactory for various reasons, among which it may be mentioned that when the tank became empty, the indicating gauge or element gave an erroneous and misleading reading or indication.

The U-tube type of indicating element has numerous advantages, but it has heretofore been unsatisfactory for use on automobiles, for the reason that in order to indicate the variations in levels of the ordinary supply tanks or containers, it was necessary to make the tube so high or long that it could not be readily mounted on the instrument board or cowl of automobiles.

An object of this invention is to provide an improved indicating device for indicating the changing levels of a liquid in a tank or container, which will permit of the exhibition of the indications at a considerable distance from the tank or container; which will always give correct readings, even though the tank may be empty; which will give correct readings or indications regardless of temperature and barometric pressure variations; which may utilize the U-tube type of indicating element in such a manner that the space occupied thereby will be relatively small for large variations in levels to be indicated, so that the indicating element may be conveniently mounted on the cowl or instrument board of automobiles; and which will be relatively simple, readily applied to automobiles, accurate, durable, dependable and relatively inexpensive.

A further object is to provide an improved device for accomplishing each and all of these objects, which may be readily used in connection with the usual vacuum feed fuel supply apparatus of automobiles.

Various other objects and advantages will be apparent from the following description of two embodiments of the invention, and the novel features will be particularly mentioned hereinafter in connection with the appended claims.

The invention comprehends various features and details, which will be pointed out as the detailed description of the illustrated embodiments of the invention proceeds, the important features of the invention being particularly pointed out in the appended claims.

In the accompanying drawing:—

Referring particularly to Figs. 1 to 3 and 5 to 7, which illustrate one embodiment of the invention, the automobile 1 shown in dot and dash lines is provided with the usual vacuum-operated fuel supply or auxiliary tank 2 for supplying fuel to the carbureter and thus to the engine by which the automobile is propelled, the liquid fuel being drawn into this vacuum supply or auxiliary tank 2 by means of suction produced in a conduit or pipe 3 leading from the same to the main fuel supply tank 4, as will be presently explained. The main fuel tank or container in this illustration is commonly carried at the rear end of the automobile, and below the level of the auxiliary or vacuum fuel supply tank 2. The details by which the fuel is drawn by suction into the tank 2 at the proper intervals have been omitted for the purpose of clarity, since they are well known in the art.

Figure 2:
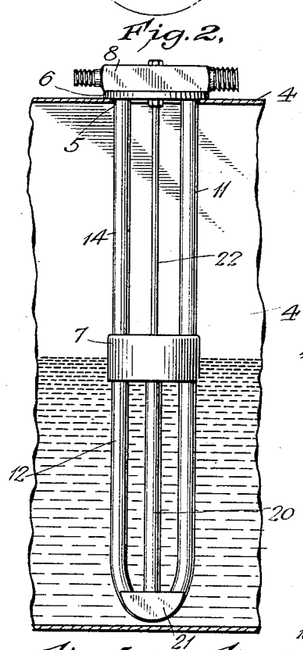
Fig. 2 is a sectional elevation through a portion of the main fuel supply tank, and having in elevation therein a part of the invention and illustrating one embodiment thereof.
Figure 3:
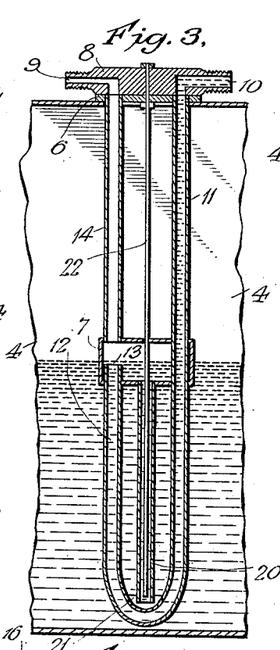
Fig. 3 is a similar sectional elevation of the tank, but with part of the invention therein in sectional elevation.

Referring now particularly to Figs. 2 and 3 the main supply tank 4 is provided at its upper end with an opening 5 which is normally closed by a plate or cap 6. A casing 7 is disposed between the uppermost and lowermost possible levels of liquid in the tank 4 preferably at approximately the middle of the tank considered vertically, so as to be about midway between the upper and lower levels of liquid in the tank when full or empty respectively. For convenience the casing 7 is disposed within the tank 4. A head or block 8 is carried by the cap 6 above the tank, and contains two conduit passages designated 9 and 10, these two conduits opening at their inner ends toward the cap 6.

A pipe or tube 11 is secured at one end to the cap 6, in alignment with the inner end of the conduit 10, passes downwardly in the container or tank to approximately the bottom of the tank, then upwardly as at 12, the upwardly extending branch 12 entering the chamber of the casing 7 and passing upwardly therein to a point between the upper and lower walls of the casing 7. Preferably the inlet end 13 of the upwardly extending branch 12 of the tube 11 is at a point approximately midway between the upper and lower walls of the casing 7, although considerable variation vertically therein is not vital.

Another tube, pipe or conduit 14 is connected at one end to the upper part of the casing 7, and at its other end is anchored in the cap 6 in alignment with the inner end of the conduit 9 of the block 8. The pipe 3 leading from the vacuum tank is removably connected to one end of the block 8 so as to be in communication with the conduit 10 thereof, and through it in communication with the tube 11 which dips down into the bottom of the tank and thence up into the casing 7.

Figure 5:
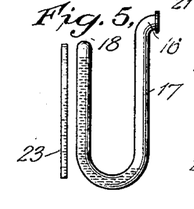
Fig. 5 is an elevation of a U-tube indicating element or gauge which may be advantageously utilized as a part of the invention, the indication shown being that when the main tank is nearly full.
Figure 6:
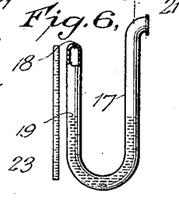
Fig. 6 is a similar elevation of the gauge and showing the indication when the tank is about half empty.
Figure 7:
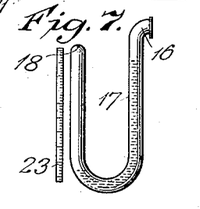
Fig. 7 is another similar elevation of the same and showing the indication thereof when the tank is practically empty.

A pipe 15 is removably connected to the other end of the block 8, in communication with the conduit 9 thereof, and extends to the instrument board or cowl of the automobile where it is connected to one arm 16 of a U-shaped indicating tube or element 17 (see Figs. 5 to 7). The other arm of the tube 17 is provided with a small vent 18 at its tip end which, while permitting the entrance and escape of air therethrough, is sufficiently small to prevent the spilling of any of the indicating liquid 19 which is within the tube.

Referring again to Figs. 1, 2 and 3, a riser tube or pipe 20 is connected to the lower wall of the casing 7 and extends downwardly to a point just above the lower bend in the tube 11, that is, at the base of the U formed by the tube 11. A pair of plates 21 are secured in any suitable manner to the opposite sides of the tube 11 at the base of the U, so as to form a small pan between them and the inner curved surface of the bend in the tube. The depending pipe 20 from the casing 7 extends below the upper edges of plates 21 and into the pan formed between the plates 21, so that the liquid from the main tank or tank 4 must enter the tube 20 through the top of the pan. The pan will always contain some of the liquid of the tank and serve as a liquid seal for the lower end of the riser tube or pipe 20.

A small vent pipe 22 extends through the cap 6 and block 8, downwardly in the tank, and opens into the riser pipe or tube 20 at a point adjacent but preferably above the lower end of the latter. Thus when liquid is drawn up through the tube 20 into the casing 7, the air vent formed by the pipe 22 will allow the entrance of a small amount of air into the rising liquid, and this small quantity of air will enter the casing 7. This air prevents rising of the liquid level in the casing 7 materially above the level of the inlet end 13 of the tube 11 and thus insures a substantially constant length of air column in the casing 7, tube 14 and pipe 15 to the indicating element on the instrument board or cowl of the automobile, regardless of temperature or barometric pressure variations. Any excess of air entering through the vent 22 will be carried over through the tube 11 to the vacuum supply tank 2.

While the tubes or pipes 11 and 22 may pass downwardly through the main tank exteriorly of the casing 7, they preferably pass through the casing 7 so as to form therewith a more rigid structure, and for convenience and to protect it against injury, the vent pipe 22 may also pass downwardly in the pipe 20 to approximately the lower or inlet end of the latter.

With a construction such as illustrated in Figs. 1 to 3 and 5 to 7, let it be assumed, for instance, that the main tank 4 is filled with liquid fuel, and that the engine of the automobile is operated sufficiently to cause a transfer of fuel between the main tank and the vacuum feed or supply tank 2. When, by reason of the operation of the engine, the suction from the vacuum supply tank is placed upon the supply pipe 3, as well known in the art, the suction in the pipe 3 will extend through the passage 10 and through the tube 11 which passes downwardly to the bottom of the tank and thence upwardly into the interior of the casing 7. The suction thus transmitted to the interior of the casing 7 will be communicated to the depending riser pipe 20 which opens into the lower part of the main tank.

By this suction, the liquid from the tank will pass upwardly through the riser tube 20 into the casing 7, and after reaching the level of the intake end 13 of the tube 11 will be drawn through the tube 11 to the vacuum supply tank. Except possibly during the actual periods of operation of the vacuum tank in drawing the liquid fuel through the casing 7, the liquid in the casing 7 will never vary materially or appreciably above or below a predetermined level in the casing 7, which level will be at approximately the level of the intake opening 13 of the tube 11. A definite quantity of air or gas will be trapped in the upper part of the casing 7, the tube 14, conduit 9 and pipe 15 to the indicating tube 17.

Since the assumed level of the liquid in the main tank 4 is above the predetermined and approximately uniform liquid level in the casing 7, air or gas trapped in the tube 14 and pipe 15 as just explained will be subjected to a pressure of an amount which will depend upon the difference in levels between the liquid in the main tank 4 and that in the casing 7. Accordingly the pressure of the gas in the tube 14 and pipe 15 will be transmitted to the indicating tube or element 17, and will press the indicating liquid 19 in such tube into the relative position shown in Fig. 5.

By means of a suitable scale 23 disposed along the unconnected arm of the U-tube, the level of the liquid in the left hand arm or branch of the indicating tube 17 will indicate the height or quantity of fuel in the main supply tank 4. Of course, during the movement of the liquid body in the tube 17, the air displaced may escape through the slight vent 18.

As the liquid is drawn from the main tank 4, its level therein will fall, and as it falls the hydraulic head caused by the difference in levels between the liquid in the tank 4 and casing 7 will decrease. Therefore, the pressure upon the air or gas trapped in the tube 14 and pipe 15 will fall, and the level of the liquid in the left hand arm (Figs. 5 to 7) of the indicating tube will fall, giving decreasing readings. When the level of the liquid in the main tank 4 has reached said predetermined level in the casing 7, there will be no pressure, (except atmospheric pressure which is balanced and therefore negligible), existing upon the gas or air trapped in the tube 14 and pipe 15. The body of indicating liquid in the tube 17 will thus seek its own common level in both branches, and this position is shown in Fig. 6. If the casing 7 is midway between the top and bottom of the main tank, the reading on the scale or index 23 will now indicate that the tank is half full.

Let it be assumed that the operation of the vehicle continues, and that as a consequence the liquid level in the main tank 4 continues to fall. When the liquid level in the tank 4 is below the said predetermined level in the casing 7, the pressure from the hydraulic head will be in a sense reversed, in that when the suction is not existing in the tube 11, the liquid in the casing 7 and riser tube 20 will tend to fall and produce a rarefaction upon the air or gas trapped in the casing 7, the tube 14, and pipe 15, and this partial vacuum or rarefaction produced in the tube 14 and pipe 15 will be transmitted to the indicating tube 17. The liquid will then rise in the right hand branch of the tube 17 toward the position shown in Fig. 7, during which the indicating level in the left hand branch in the tube will continue to fall and by its descent down the scale 23 will indicate by decreasing readings the falling level of the liquid in the tank 4. It will be understood that the reason for the continued fall of the indicating liquid in the tube 17 is due to the increasing vacuum or rarefaction caused by the increasing difference in levels between the liquid in the casing 7 and the main tank 4.

It will be obvious that when the liquid level in the main tank 4 is above said predetermined level in the casing 7, the indicating tube 17 will be responsive to pressures upon the air trapped in tube 14 and pipe 15, and when below said predetermined level, the liquid in the indicating tube 17 will be responsive to different extents of vacuum or rarefaction upon the trapped gas or air in the tube 14 and pipe 15. It will be observed that there must always be a certain amount of liquid in the casing 7 before the liquid can enter the tube 11, and when the main tank becomes empty and air instead of liquid is sucked up the riser tube 20, the air will pass through the tube 11 into the vacuum tank.

If the liquid seal in the pan formed in the lower bend of the tube 11 by the plates 21 were not provided, this air passing up the riser tube 20 would let all of the liquid in the casing 7 drop back into the supply tank and then there would be atmospheric pressure in the casing 7. In such a contingency, the liquid in the U-shaped indicating tube 17 would seek its own level and indicate upon the scale 23 that the tank is one half full, whereas in fact the tank is empty.

With this liquid seal, however, it will be noted that when the tank becomes empty or nearly empty, correct readings will always be given. While the air rushing up the riser tube 20 may cause fluctuations of the liquid in the indicating tube 17 during the operation of the vacuum supply tank 2, as soon as the action of the vacuum tank ceases, the partial vacuum condition in the casing 7 caused by the liquid held therein, will be reestablished. This is due to the fact that the liquid seal will permit liquid or air to enter the casing 7, but will prevent the return of the surplus liquid in the casing 7 into the main tank. Thus, an erroneous reading of the indicating tube when the tank is empty is prevented.

It will be noted that the compensating air vent or tube 22 is open at both ends, the upper end always being above the liquid level in the tank 4, and the lower end terminating in the riser tube 20, preferably at about or somewhat above the lower or inlet end thereof. The upward movement of the liquid in the tube 20 by the suction from the vacuum supply tank will draw a small quantity of air through the vent or compensating air pipe 22, and this air thus drawn in will largely pass into the casing 7 and along with the liquid into the vacuum supply tank. In this manner a substantially constant level of liquid in the casing 7 will be maintained, thus compensating for expansion and contraction of air in the casing 7, tube 14 and pipe 15, such as may be caused by variations in temperature and barometric pressures.

If the suction from the vacuum supply tank is not applied for considerable lengths of time, or if temperature or barometric pressure changes take place during an interval, the liquid in the chamber of the casing 7 will slightly rise or lower as the case may be, but this slight variation will be at once corrected as soon as suction is again applied. The cross sectional area of the chamber of the casing 7 is relatively large and offsets, to a large extent, minor variations in the liquid level in the casing 7.

The U-shaped bend in the tube 11 eliminates the necessity of a one-way valve at the inlet end of the tube 11, and permits return of all surplus liquid in the supply line or pipe 3 and tube 11 into the main tank through the compensating chamber in the casing 7, except that the U-portion of the tube 11 will always retain enough liquid therein to balance any partial vacuum which may exist in the casing 7, and thus insure the establishment of a vacuum reading in the indicating tube 17 when the tank is empty or nearly empty.

Figure 1:
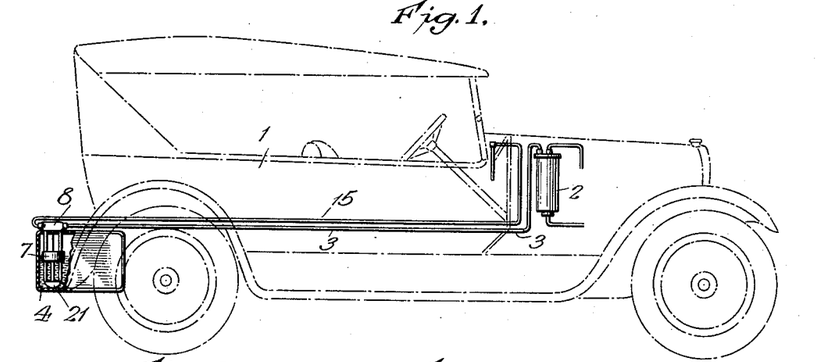
Fig. 1 is a diagrammatic elevation of an automobile, and indicating the application thereto of an indicating device constructed in accordance with this invention, wherein the fuel vacuum feed apparatus of the automobile is utilized advantageously as a part thereof.
Figure 4:
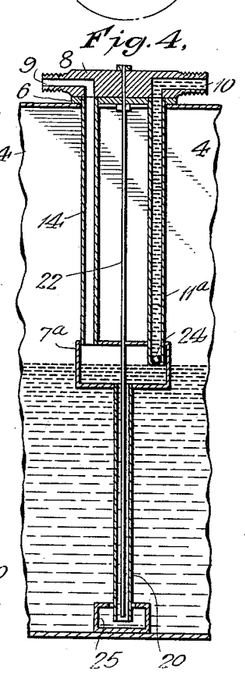
Fig. 4 is a similar sectional elevation of a modified construction of this part of the invention.

Referring now to the embodiment or modification of the invention shown in Fig. 4, wherein parts similar to those in the other figures will be designated by the same reference characters, the tube 11a corresponding to the tube 11 of Figs. 1 to 3, instead of extending to the bottom of the tank and then upwardly, will enter the casing 7a, corresponding to the casing 7, from the top, and depend within the casing 7a to approximately the desired predetermined level to be maintained therein. The tube 11a will be provided at its lower end within the casing 7a with a one-way valve 24 for preventing return of liquid in the tube 11a and pipe line 3, when the suction from the vacuum supply tank ceases. This insures the maintenance of a constant level of the liquid in the casing 7a without influence thereon of the hydraulic head upon the liquid retained in the tube 11a and pipe line 3. The one-way valve may conveniently comprise a ball which seeks its own seat in a restricted orifice in the lower end of the tube 11a, but obviously any other form of one-way valve may be employed. The lower end of the riser tube 20 depends and opens into an upright pan 25, and the latter, being open at its upper end to the main tank, serves to hold sufficient liquid therein to act as a liquid seal for the lower or intake end of the riser 20. The construction is otherwise the same as in Figs. 1 to 3.

The operation is the same as described for Figs. 1 to 3, except that the one-way valve takes the place of the bend in the tube 11 for maintaining the substantially constant predetermined level in the casing 7a.

Assuming, by way of example, that the main tank 4 is twelve inches deep and that the indicating tube 17 contains an indicating liquid having the same specific gravity as the liquid in the tank 4 whose level is to be measured, it has heretofore been necessary to employ a U-tube 17 having branches or arms at least twelve inches high for each leg or arm. In accordance with this invention, however, where the upper half of the liquid in the main storage tank is indicated by pressure, and the lower half is indicated by partial vacuum, the U-tube 17 for a twelve inch tank need be but six inches in height for each side or arm of the U-tube. This U-tube indicating instrument may be readily designed of a size sufficiently small to be placed upon the ordinary instrument board or cowl of an automobile. Of course, when the liquid in the U-shaped indicator tube 17 has a specific gravity heavier than that of the liquid in the main tank 4 whose level is to be measured, the lengths of the legs or arms of the indicating U-tube 17 may be proportionally reduced.

Because of this novel construction, for a depth of twelve inches in a main tank and using a combination of pressure and partial vacuum for the indication of the liquid level, the indicating U-shaped tube or element need be little more than six inches high as a maximum, because the upper six inches of the main tank utilizes the full height of the indicating U-tube under pressure and the lower six inches of the main tank utilizes the full height of the same indicating U-tube under partial vacuum.

It will be noted that with this construction, the level or quantity indicating element 17 will always give correct readings, even though the main tank may become empty in use, and without influence or inaccuracies due to changes in temperature or barometric pressures. While the casing has, as a matter of preference, been illustrated within the tank 4, it will be understood that this is optional, and that the casing and pipes leading to it may all be disposed exteriorly of the tank 4 if desired. It will be further understood that the invention, in its broadest aspects is not limited to use with automobiles, the suction in pipe 3 in other cases being supplied from a suitable source such as a suction pump.

It will be obvious that various changes in the details, which have been herein described and illustrated for the purpose of explaining the nature of the invention, may be made by those skilled in the art within the principle and scope of the invention as expressed in the appended claims.

I claim:—

1. In a device for indicating the quantity of liquid in a container, a casing disposed at a level between the uppermost and lowermost possible levels of the liquid of the container, a conduit connecting the casing to the container to receive a portion of the latter's contents and opening into the container at the minimum liquid level to be indicated, suction means having a connection opening into said casing at a predetermined level therein and having provision whereby the connection is sealed against the flow of air therethrough to the casing thus insuring an elevation of the level of the liquid in said casing to approximately said predetermined level, another conduit connected to said casing above the said predetermined level, and a gauge responsive to both vacuum and pressure connected to said last named conduit, whereby said gauge will indicate liquid levels in response to variable pressures when the level of the liquid in the container is above said predetermined level in the casing, and indicate liquid levels in response to variable extents of vacuum when the level of the liquid in the container falls below said predetermined level in the casing.

2. In a device for indicating the quantity of liquid in a container, a casing disposed at a level between the uppermost and lowermost possible levels of the liquid of the container, a conduit connecting the casing to the container to receive a portion of the latter's contents and opening into the container at the minimum liquid level to be indicated, suction means having a connection opening into said casing at a predetermined level for withdrawing liquid from said casing and having provision for sealing said connection, automatically upon the cessation of suction, against the flow of air therethrough to the casing, thus insuring an elevation of the level of the liquid in said casing to approximately said predetermined level, another conduit connected to said casing above the said predetermined level, a gauge responsive to both vacuum and pressure connected to said last named conduit, whereby said gauge will indicate liquid levels in response to variable pressures when the level of the liquid in the container is above said predetermined level in the casing, and indicate liquid levels in response to variable extents of vacuum when the level of the liquid in the container falls below said predetermined level in the casing, and a liquid seal trap in the connection between the casing and the container for preventing return of the surplus liquid in the casing to the container when the container becomes empty.

3. In a device for indicating the quantity of liquid in a container, a casing disposed at a level between the uppermost and lowermost possible levels of the liquid of the container, a conduit connecting the casing to the container to receive a portion of the latter's contents and opening into the container at the minimum liquid level to be indicated, means having a connection opening into said casing at a predetermined level therein and having provision whereby the connection is sealed against the flow of air therethrough to the casing thus insuring an elevation of the level of the liquid in said casing to approximately said predetermined level, another conduit connected to said casing above the said predetermined level, a gauge responsive to both vacuum and pressure connected to said last named conduit, whereby said gauge will indicate liquid levels in response to variable pressures when the level of the liquid in the container is above said predetermined level in the casing, and indicate liquid levels in response to variable extents of vacuum when the level of the liquid in the container falls below said predetermined level in the casing, and an air vent conduit extending from a point above the highest possible level in the container to a point in the conduit connecting the casing to the container, whereby small quantities of air will be drawn into the casing during the elevation of the liquid therein, to compensate for temperature and barometric variations.

4. In a device for indicating the quantity of liquid in a container, a casing disposed at a level between the uppermost and lowermost possible levels of the liquid of the container, a conduit connecting the casing to the lower part of the container to receive a portion of the latter's contents and opening into the container at the minimum liquid level to be indicated, suction means having a connection opening into said casing at a predetermined level for withdrawing liquid from said casing and having provision for sealing said connection, automatically upon the cessation of suction, against the flow of air therethrough to the casing, thus insuring an elevation of the level of the liquid in said casing and maintaining it approximately at said predetermined level, independently of the level of the liquid in the container, a gauge responsive to both vacuum and pressure, and a conduit connecting said gauge to said casing, whereby said gauge will indicate liquid levels in response to variable pressures when the level of the liquid in the container is above the said predetermined level in the casing, and also indicate liquid levels in response to variable extents of vacuum when the level of the liquid in the container is below said predetermined level in the casing.

5. In a device for indicating the quantity of liquid in a container, a casing disposed at a level between the uppermost and lowermost possible levels of the liquid of the container, a conduit connecting the casing to the container to receive a portion of the latter's contents and opening into the container at the minimum liquid level to be indicated, means having a connection opening into said casing at a predetermined level therein and having provision whereby the connection is sealed against the flow of air therethrough to the casing thus insuring an elevation of the level of the liquid in said casing to approximately said predetermined level, said means including a pipe connected to said casing and extending above the maximum level to be indicated, another conduit connected to said casing above the said predetermined level, and a gauge responsive to pressures both above and below atmospheric pressure for indicating the liquid levels of the liquid in the container.

6. In a device for indicating the quantity of liquid in a container, a casing disposed in said container at a point between the uppermost and lowermost possible levels of the liquid of the container, a riser tube connecting the lower part of the casing to the bottom portion of the container at the minimum liquid level to be indicated to permit entrance of the liquid from the container into said tube and casing, means including a suction tube connected to an interior portion of the chamber of said casing at a predetermined level therein for drawing liquid from the container through said casing and having provision for sealing said suction tube against the flow of air therethrough to the casing, thus insuring the elevation of liquid in said casing to said predetermined level, a tube connected to the upper part of said casing, and an indicating device responsive to both vacuum and pressures connected to said last named tube, whereby said indicating device will indicate the liquid levels in said container by response to pressures when the liquid level in the container is above said predetermined level in the casing and in response to variable extents of vacuum when the level of the liquid in the container falls below said predetermined level in the casing.

7. In a device for indicating the quantity of liquid in a container, a casing disposed in said container at a point between the uppermost and lowermost possible levels of the liquid of the container, a riser tube connecting the lower part of the casing to the bottom portion of the container at the minimum liquid level to be indicated to permit entrance of the liquid from the container into said tube and casing, means including a suction tube connected to an interior portion of the chamber of said casing at a predetermined level therein for drawing liquid to be used from the container through said casing and having provision for sealing said suction tube against the flow of air therethrough to the casing automatically upon the cessation of suction therein thereby insuring the elevation of liquid in said casing to said predetermined level, a tube connected to the upper part of said casing, an indicating device responsive to both vacuum and pressures connected to said last named tube, whereby said indicating device will indicate the liquid levels in said container by response to pressures when the liquid level in the container is above said predetermined level in the casing and in response to variable extents of vacuum when the level of the liquid in the container falls below said predetermined level in the casing, and an air vent conduit extending from a point above the uppermost possible level of the liquid in the container to a point in the riser tube, whereby when the liquid moves upwardly through said riser tube into the casing, sufficient air will be carried along to prevent the rise of liquid in the casing materially above said predetermined level during changes in temperature and barometric pressures.

8. In a device for indicating the quantity of liquid in a tank, a compensating casing disposed at a level between the uppermost and lowermost possible levels of the liquid in the tank, a riser tube connecting the casing to the lower part of the tank and opening into the tank at the minimum liquid level to be indicated to receive a portion of the liquid from the tank, means having a connection opening into the interior of the casing at a predetermined level therein for drawing the liquid from the tank, through said casing, and having provision for sealing said connection against the flow of air therethrough to the casing thus insuring the elevation of the liquid to said predetermined level in the casing which is at approximately the level of the connection of said means to the casing, a pressure and vacuum responsive indicating element, and means connecting said element to the casing above said predetermined level whereby said element will indicate the level of the liquid in the tank by its response to pressures when the liquid level in the tank is above said predetermined level in the casing and in response to various extents of vacuum in said casing when the level of liquid in the tank is below said predetermined level in the casing.

9. In a device for indicating the quantity of liquid in a tank, a compensating casing disposed at a level between the uppermost and lowermost possible levels of the liquid in the tank, a riser tube connecting the casing to the lower part of the tank and opening into the tank at the minimum liquid level to be indicated to receive a portion of the liquid from the tank, means having a connection opening into the interior of the casing at a predetermined level therein for drawing the liquid from the tank, through said casing, and having provision for sealing said connection against the flow of air therethrough to the casing thus insuring the elevation of the liquid to said predetermined level in the casing which is at approximately the level of the connection of said means to the casing, a pressure and vacuum responsive indicating element, means connecting said element to the casing above said predetermined level whereby said element will indicate the level of the liquid in the tank by its response to pressures when the liquid level in the tank is above said predetermined level in the casing and in response to various extents of vacuum in said casing when the level of liquid in the tank is below said predetermined level in the casing, and an air vent conduit connected to a point in said riser tube for supplying a small quantity of air thereto during the passage of liquid through said riser tube into the casing.

10. In an automobile having a vacuum feed tank and a main storage tank between which the liquid fuel is transferred at intervals by suction, a casing disposed at a level between the uppermost and lowermost possible levels of the fuel level in the main tank, a riser pipe connecting the casing to the lower part of the tank and opening into the tank at the minimum liquid level to be indicated, to receive fuel from the latter, a tube connecting the vacuum tank to the casing at a point in the interior thereof between its upper and lower walls, whereby the fuel passing between the tanks will pass through said casing to a predetermined level corresponding to the level of the intake end of said tube within the casing, an indicating element responsive to vacuums and pressures, and a conduit connecting said element to the upper part of said casing, whereby said element will indicate the level of fuel in the main tank in response to the normal pressure in the casing when the level of liquid fuel in the main tank is above said predetermined level in the casing, and in response to variable extents of vacuum when the level of liquid fuel in the main tank falls below said predetermined level in the casing.

11. In an automobile having a vacuum feed tank and a main storage tank between which the liquid fuel is transferred at intervals by suction, a casing disposed at a level between the uppermost and lowermost possible levels of the fuel level in the main tank, a riser pipe connecting the casing to the lower part of the tank and opening into the tank at the minimum liquid level to be indicated to receive fuel from the latter, a tube connecting the vacuum tank to the casing at a point in the interior thereof between its upper and lower walls, and having provision for sealing its passage against the flow of air therethrough to the casing whereby the fuel passing between the tanks will pass through said casing to a predetermined level corresponding to the level of the intake end of said tube within the casing, an indicating element responsive to vacuums and pressures, a conduit connecting said element to the upper part of said casing, whereby said element will indicate the level of fuel in the main tank in response to the normal pressure in the casing when the level of liquid fuel in the main tank is above said predetermined level in the casing, and in response to variable extents of vacuum when the level of liquid fuel in the main tank falls below said predetermined level in the casing, and an air vent conduit extending from a point above the uppermost likely level of fuel in the main tank and connected to the riser pipe adjacent the inlet end of the latter, whereby sufficient air will be carried into the casing by the travel of fuel through the riser pipe into the casing to insure a constant length of air column in said conduit and casing regardless of variations in temperatures and barometric pressures.

12. In a device for indicating the quantity of liquid in a container, a casing disposed at a level between the uppermost and lowermost possible levels of the liquid of the container, a conduit connecting the casing to the container to receive a portion of the latter's contents and opening into the container at the minimum liquid level to be indicated, means including a suction tube opening into said casing at a predetermined level therein, extending downwardly below the minimum level to be indicated, then above the maximum level to be indicated, thereby insuring an elevation of the level of the liquid in said casing, independently of the level of the liquid in the container, to approximately said predetermined level, another conduit connected to said casing above the said predetermined level, and a gauge responsive to both vacuum and pressure connected to said last named conduit, whereby said gauge will indicate liquid levels in response to variable pressures when the level of the liquid in the container is above said predetermined level in the casing and indicate liquid levels in response to variable extents of vacuum when the level of the liquid in the container falls below said predetermined level in the casing.

13. In a device for indicating the levels of a liquid in a tank, a casing, a riser tube connected to said casing, opening into the lower part thereof, and depending therefrom, a gauge tube connected to said casing, opening into the upper part thereof, and extending upwardly a distance such that the distance between the lower end of the riser tube and the upper end of the gauge tube will exceed the maximum difference in liquid levels to be indicated, a suction tube connected to said casing, opening therein at a level below the opening of the gauge tube into said casing, extending to a level below the opening in the lower end of said riser tube, then upwardly for a distance exceeding the said maximum difference in levels to be indicated, and an air vent conduit opening into said riser tube at a point inwardly from its lower open end and extending thereabove to a height exceeding the said maximum difference in levels to be indicated.

14. In a device for indicating the levels of a liquid in a tank having an opening in its upper wall, a head having a size and shape to close said opening when attached to said tank over said opening, a pair of tubes depending therefrom, a casing, one of said tubes opening into the upper part of and supporting said casing, and a riser conduit opening into the lower part of said casing, depending therefrom and opening at its lower end at the minimum level to be indicated, the other of said tubes extending below said minimum level and then opening into said casing at a predetermined level.

15. In a device for indicating the levels of a liquid in a tank having an opening in its upper wall, a head having a size and shape to close said opening when attached to said tank over said opening, a pair of tubes depending therefrom, a casing, one of said tubes opening into the upper part of and supporting said casing, and a riser conduit opening into the lower part of said casing, depending therefrom, and opening at its lower end at the minimum level to be indicated, the other of said tubes opening into said casing at a predetermined level therein and having provision for sealing itself automatically against the flow of air therethrough into said casing, but permitting withdrawal therethrough of liquid from the casing.

16. In a device for indicating the levels of a liquid in a tank having an opening in its upper wall, a head having a size and shape to close said opening when attached to said tank over said opening, a pair of tubes depending therefrom, a casing, one of said tubes opening into the upper part of and supporting said casing, a riser conduit opening into the lower part of said casing, depending therefrom, and opening at its lower end at the minimum level to be indicated, the other of said tubes opening into said casing at a predetermined level therein and having provision for sealing itself automatically against the flow of air therethrough into said casing but permitting withdrawal therethrough of liquid from the casing, and an air vent tube extending from an exterior face of said head and opening into the riser conduit at a point inwardly from the lower open end of said conduit.

17. In a device for indicating the levels of a liquid in a tank having an opening in its upper wall, a head having a size and shape to close said opening when attached to said tank over said opening, a pair of tubes depending therefrom, a casing, one of said tubes opening into the upper part of and supporting said casing, a riser conduit opening into the lower part of said casing, depending therefrom, and opening at its lower end at the minimum level to be indicated, the other of said tubes extending beneath the lower end of the riser conduit, then upwardly to said casing and opening into said casing at a predetermined level, and plates secured across the sides of the bottom bend in the said other of said tubes and forming with the bend in the tube a liquid seal pan into which the lower end of the riser conduit opens.

18. In a gauge system for a tank, an air chamber disposed above the minimum level to be indicated, a pressure gauge connected to said chamber, a liquid delivery pipe through which liquid may be delivered from the tank by pressure differences and having communication with said chamber, said chamber being closed from communication with said tank except through said pipe, and an air conducting conduit for admitting air into said delivery pipe before said liquid reaches said casing and releasing it therein at a point such that when released it will all be free to rise into said chamber whether the flow of liquid is continuous or intermittent.

19. In a gauge system for a tank, a closed casing disposed above the minimum level to be indicated, connections by which liquid may be delivered from said tank and through said casing by pressure differences and including an ascending passage into said casing, and through which the liquid ascends into said casing from said tank, a pressure gauge having a pipe connected to said casing, and means for introducing air directly into said ascending passage by fluid flow through said connections.

20. In a gauge system for a tank, a closed chamber disposed above the minimum level to be indicated, a pressure gauge connected to said chamber, means for delivering liquid from said tank by pressure differences and having an ascending communication with said chamber and through which the liquid ascends into said casing from said tank, and means operable by the flow in said delivering means for delivering air directly into said ascending communication in quantities proportional to the duration of flow of liquid through that passage, whereby said air as released may rise into said chamber independently of a continuation of flow in said delivering means.

21. In a depth indicating device for liquids in tanks, a closed chamber disposed above the minimum level to be indicated and having a single communication with said liquid at the full depth to be measured, a pressure gauge, a pipe connecting said gauge with said chamber, means for delivering liquid from said tank through said casing by pressure differences and providing said single communication, and means made effective by liquid flow into said chamber for introducing and releasing air into said delivering means at a point between said casing and the entrance of liquid with said delivering means, for movement with the liquid flow into said chamber, and for continuing the introduction of air into said liquid flow throughout the duration of the flow.

22. In a gauge system for a tank, a closed chamber disposed above a minimum level to be indicated and communicating with a liquid at the full depth to be measured, means for delivering liquid from said tank by pressure differences through said chamber and providing said communication, and means for automatically introducing and releasing air into said liquid being delivered before it reaches said chamber and at a point such that upon any cessation of flow of the liquid being delivered, the released air will all rise into said chamber by its own buoyancy, a pressure gauge, and means connecting said gauge to said chamber.

23. In a gauge system for a tank, a closed air chamber having an inlet communicating through its lower portion with the liquid at the depth to be measured, outlet means opening into said chamber at a level above the inlet opening thereof for delivering liquid from said tank and through said chamber by pressure differences, and means for automatically introducing and releasing air into said liquid being delivered prior to its entrance into said chamber, whereby the upward movement of the liquid in said chamber in reaching the outlet therefrom will accelerate the release of the entrained air from the liquid entering the chamber, a pressure gauge, and a pipe connecting said gauge to said chamber above the level of the outlet therefrom.

24. In a gauge system for a tank, a closed casing, a pipe connecting said casing to the tank at the minimum level to be indicated, a liquid withdrawal pipe opening into the casing at a point below the top of the casing and by its open end in the casing determining the lower level of air in said casing, whereby liquid withdrawn from said tank will pass through said casing, a pressure gauge having a pipe communicating with the interior of the casing above the said level, and means for admitting small quantities of air to the liquid which is conducted through said casing before the liquid reaches said casing.

25. In a gauge system for a tank, said tank, a closed casing having a pipe leading therefrom and opening into said tank at the minimum liquid level in said tank which is to be indicated, a delivery pipe also opening into said casing completely below the top of said casing and determining the liquid level in said casing, and by which liquid may be withdrawn from said tank through said first pipe and said casing, and an air vent of small capacity opening into said first pipe whereby liquid moving through said first pipe towards the casing will draw air into it automatically throughout the continuation of the flow; a pressure gauge, and a pipe connecting said gauge and casing and opening into said casing at a point above the liquid level therein.

26. In a gauge system for a tank, said tank, a closed casing disposed at a point well above the minimum liquid level of said tank to be indicated, a pipe descending from said casing and opening into said tank at the said minimum level, a second pipe opening into said casing well below the top thereof to provide an air chamber in said casing, to determine the maximum level of liquid in said casing, and through which liquid may be conducted from said tank by pressure differences, means for admitting air to said descending pipe in small quantities automatically throughout the duration of liquid flow through said pipe to said casing, a pressure gauge, and a pipe connecting said gauge to said casing and opening into said casing at a level higher than the opening of said second pipe into said casing.

27. A method of uninterruptedly indicating the level of a liquid in a tank in which the level may be changing, which comprises drawing liquid from said tank at the minimum liquid level to be indicated, conducting the withdrawn liquid by pressure differences through a closed casing disposed above the minimum level to be indicated with the liquid leaving said casing at a point well below its top to provide an air chamber in said casing, introducing air into said liquid being withdrawn, before said liquid reaches said casing, continuously throughout the continuation of liquid flow through said casing, and utilizing a gauge responsive to the air pressure in said casing to indicate the level of liquid in said tank.

28. In a gauge system for indicating the liquid level in a tank, the combination of said tank, a closed casing disposed at a level between the maximum and minimum levels to be indicated, a riser pipe opening at one end into said casing and at its other end into said tank at the minimum level of liquid in said tank which is to be indicated, a delivery pipe also opening into said casing below the top thereof, a pressure gauge, and means connecting said gauge to the interior of said casing at a point above the opening of the delivery pipe into said casing, whereby liquid may be withdrawn from said tank through said riser pipe, said casing and said delivery pipe by pressure differences, and the level of liquid in said tank uninterruptedly indicated by said gauge.

In witness whereof, I hereunto subscribe my signature.

REED M. CHAMBERS.